Sept. 18, 1945.  W. O. BENNETT, JR  2,385,252
BALANCE SCREW
Filed April 12, 1943

INVENTOR.
WILLIAM O. BENNETT, JR.
BY James M. Heitman
ATTORNEY

Patented Sept. 18, 1945

2,385,252

UNITED STATES PATENT OFFICE 2,385,252

BALANCE SCREW

William Ogle Bennett, Jr., Lancaster Township, Lancaster County, Pa., assignor to Hamilton Watch Company, Lancaster, Pa.

Application April 12, 1943, Serial No. 482,730

3 Claims. (Cl. 58—107)

This invention relates to a screw used in arriving at the poise of the balance wheel in watches.

In the poising of a balance wheel it has long been the practice to change the weight distribution of the wheel by removing certain of the screws located on the periphery of the balance wheel and replacing them with similar screws of greater or lesser weight. This is the first step and replaces the standard weight screws with others of lesser or greater weight. A rough balance is obtained in this manner.

The balance wheel is then paired with a hairspring and the screws are again changed to correct for time. In this instance the screws are changed in opposite pairs so that the balance is not disturbed although the balance wheel is given more or less mass to correct for error in timekeeping.

A still further operation is now carried out to bring the balance wheel to exact poise. The balance wheel is rested on two knife edges and allowed to turn freely. Of course the heaviest screw will finally come to rest in the lowermost position. This screw is removed and by abrasion a very slight portion of the metal of the screw removed. This metal is removed from the rearward face of the screw head making it necessary to remove a screw each time the balance wheel is adjusted. It is then replaced and the operation repeated until the balance wheel is perfectly poised. This final operation may take as long as thirty minutes.

The purpose of this invention is to provide a balance screw which may be adjusted for weight without removing it from the balance wheel.

A further object is to provide a balance screw which will have the weight removed from the outward surface of the screw rather than the rearward surface.

A further object is to provide a guiding means for the tool used in removing the excess weight.

A further object is to provide a screw from the outward surface of which material may be removed without marring the outer surface of the screw driver slot.

A further object is to provide a balance screw formed with a tapered central hole in its head.

The invention is illustrated in the accompanying drawing in which.

Figure 1:
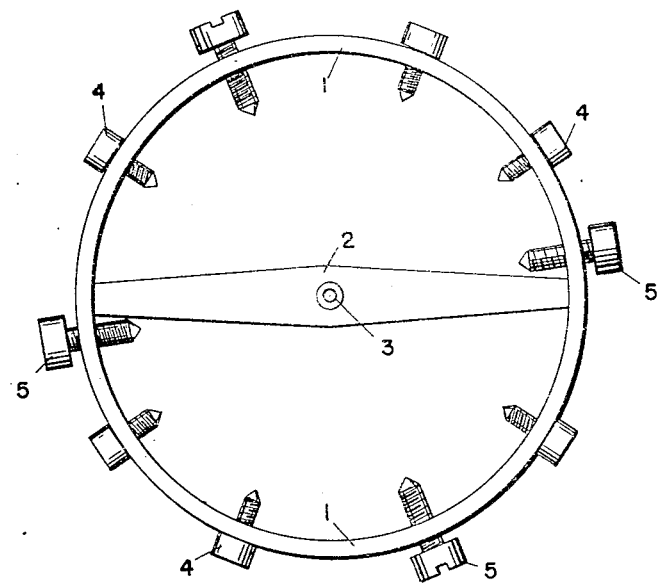
Fig. 1 is a plan view of a balance wheel to which the screws are applied, as shown.
Figure 2:
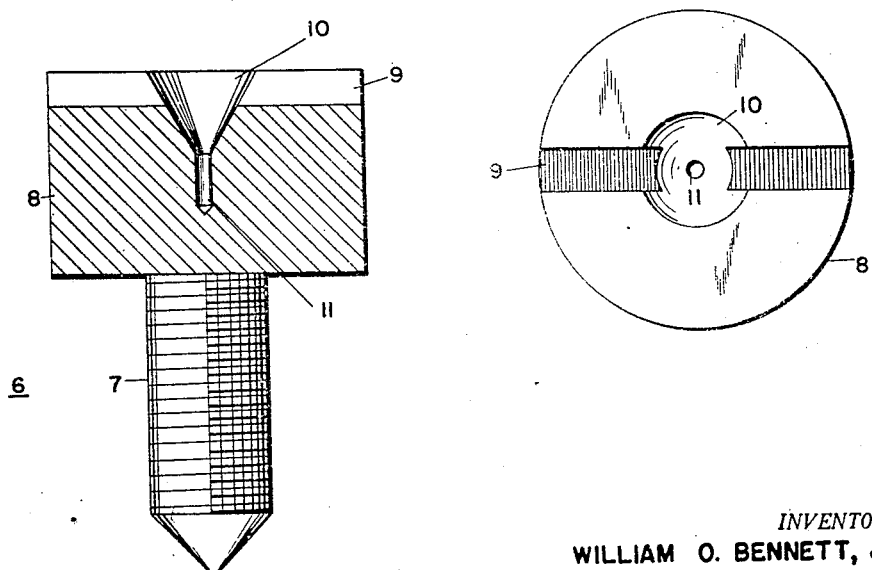
Fig. 2 is a section of one of the balance screws.
Figure 3:
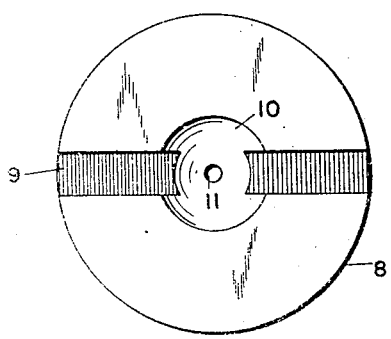
Fig. 3 is a top plan of said screw.

In the drawing a balance wheel 1 having a cross piece 2 and a staff 3 is shown with balance screws 4 and mean time screws 5.

These balance screws are the means both of poising the wheel for true balance and for synchronizing said wheel with a particular hair spring by changing certain pairs of said screws for others of greater or lesser weight, thus changing the mass of the balance wheel and its period as effected by said hair spring.

Heretofore, in the final poising of the balance wheel the screws 4 are removed and tiny quantities of metal are scraped or filed from the rear surface of the screw head. The screw is then returned to the balance wheel and the poising operation continued until the poise or balance is perfect. In the removal and return of the screws error may enter. A screw may not be tightened quite the same as before and this difference may be enough to throw the wheel off balance. It would, therefore, be a great advantage if the excess material could be removed from the outward surface of the screw head. This is not done in the case of conventional balance screws mainly because of appearance of the thus mutilated screw and the fact that too much filing would destroy the screw driver slot.

With the balance screw which is the subject of this application the material may be removed from the outward surface of the screw head and without removing the screw from the balance wheel.

This screw 6 has a threaded portion 7 and a head 8 formed with a slot 9 and a central conical depression 10. Extending downward from the center of the depression 10 is a hole 11 which serves as a guide for the abrading tool.

With this screw it is only necessary to grip the balance firmly and rotate a specially designed abrading tool in the conical depression 10. The tool used is one having a guiding pin with tapered cutting edges engaging the surface of the depression. By rotating the tool with slight pressure enough material is removed to effect the balance.

This tool will remove excess material from the side of the depression and without in any way marring the head of the screw or without rendering the slot unfit for use, the necessary weight is removed from the screw head. It must be borne in mind that these screws are smaller than the ordinary pin head so that all the work is delicate. This makes the guiding hole 11 especially important as without it the tool would slip and mutilate the slot.

The screw here shown has a conical depression but it would only be necessary to have the guiding hole as the rotation of the tool would make the depression. However, a screw with a previously formed depression would allow the material to be removed more evenly than one having just the guiding hole.

The use of this balance screw saves more than one-half the time required to finally poise a balance wheel.

What is claimed is:

1. A balance assembly for timepieces including a balance wheel, a plurality of balance screws carried by said wheel, each of said screws comprising a threaded portion, and a head portion formed with a slot and a central conical shaped depression, said depression being extended to form a hole for tool guiding purposes.

2. A balance assembly for timepieces including a balance wheel, a plurality of balance screws carried by said wheel, each of said screws comprising a threaded portion, and a head portion formed with a slot and a central conical depression, said depression being extended to form a tool guiding means.

3. A balance assembly for timepieces including a balance wheel, a plurality of balance screws carried by said wheel, each of said screws comprising a threaded portion receivable in said balance wheel, and a head portion formed with a slot and central conical depression and adapted to extend beyond the rim of said wheel, said depression being extended to form a tool guiding means, whereby a portion of the screw may be removed from the surface of the conical depression by an abrading tool without removing the screw from the balance wheel.

WILLIAM OGLE BENNETT, Jr.